United States Patent

[11] 3,561,635

[72] Inventor Robert C. Henderson
 9763 W. Virginia Drive, Denver, Colo. 80231
[21] Appl. No. 771,777
[22] Filed Oct. 30, 1968
[45] Patented Feb. 9, 1971

[54] TAMPER-PROOF COVER FOR SPEEDOMETER ODOMETERS
 7 Claims, 5 Drawing Figs.
[52] U.S. Cl. ................................................. 220/4,
 220/82; 235/95; 250/85
[51] Int. Cl. .................................................. B65d 25/54,
 G01c 22/00
[50] Field of Search ...................................... 220/4, 27,
 82; 235/95, 96, 95.2, 97; 73/490; 250/85CD; 258/85CD

[56] References Cited
UNITED STATES PATENTS

| | | | |
|---|---|---|---|
| 1,319,205 | 10/1919 | Carson | 235/97 |
| 2,937,279 | 5/1960 | Artandi | 250/85(CD) |
| 3,338,514 | 8/1967 | Weinreich | 235/95X |
| 3,396,269 | 8/1968 | Sorenson | 220/82X |

FOREIGN PATENTS

| | | | |
|---|---|---|---|
| 984,593 | 2/1965 | Great Britain | 220/27 |
| 69,971 | 1/1927 | Sweden | 235/95.2 |

*Primary Examiner*—George E. Lowrance
*Attorney*—Richard D. Law

ABSTRACT: The odometer of a vehicle speedometer is provided with a transparent cover, preferably glass, completely enclosing the number wheels and a nonremovable closure member for the cover is provided with means indicating tampering with the cover on visual observation of an installed odometer. The cover is readily usable on existing odometers of American made vehicles as well as original equipment.

PATENTED FEB 9 1971

3,561,635

INVENTOR.
Robert C. Henderson
BY Richard D. Law
ATTORNEY

3,561,635

TAMPER-PROOF COVER FOR SPEEDOMETER ODOMETERS

Odometers are conventional on most ground operated vehicles to indicate the milage travelled by the vehicle. A fairly common practice by some used automobile dealers is to turn back an odometer to register fewer miles than the vehicle has actually travelled. Some states have laws against such practice, but here is presently no method of detecting such tampering by observing the odometer itself. The current practice of giving new car warranties for a certain number of miles driven, also, has opened a field for odometer tampering, but again there is no way for a visual observation of the odometer to ascertain whether or not the registered milage is the actual milage driven. Rented cars are subject to odometer tampering where the charge is based in part on miles travelled. All the cases of turning back an odometer involves considerable money with the person or persons turning the odometer back attempting to gain from a lesser milage showing on the odometer.

Included among the objects and advantages of the invention is to provide tamper-proof cover means for vehicle speedometer odometers.

Another object of the invention is to provide a nonremovable cover, without breaking, for speedometer odometers.

A further object of the invention is to provide an odometer cover arranged for use with existing odometers on American vehicles as well as for original equipment odometers, which includes a transparent, frangible case and a nonremovable cap therefore.

A still further object of the invention is to provide a glass cover for speedometer odometers which provides a tamper-proof enclosure for such odometers.

These and other objects and advantages of the invention may be readily ascertained by referring to the following description and appended illustrations in which.

In general, the invention provides a transparent tube over an odometer with a cap that will be destroyed on removal, and indicating means for visual observation of the condition of the cover and its cap. The tube is preferably made of glass to prevent drilling and tampering with the number wheels of the odometer.

Figure 1:
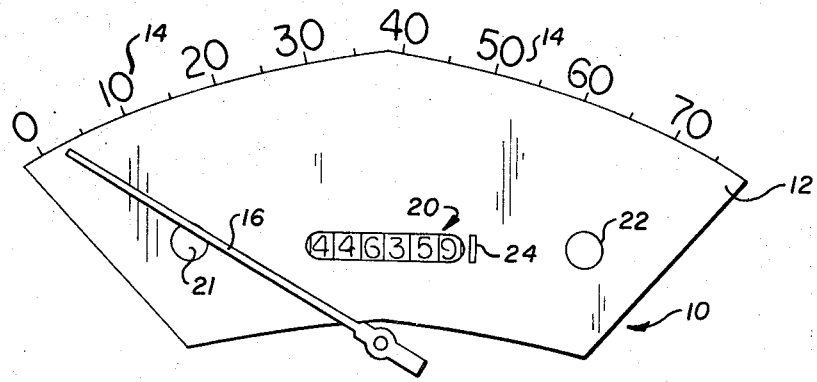
FIG. 1 is a generally schematic, front elevational view of a vehicle speedometer with an odometer having tamper-proof indicator according to the invention.

As illustrated in FIG. 1, a speedometer, shown generally by numeral 10, includes a mounting plate 12 having a plurality of speed indicator numbers 14 and a pivoted pointer or arm 16 arranged for travel there across. An odometer, shown generally by numeral 20, is mounted to display one line of numbers on a plurality of number wheels through a slot in the plate. Stops 21 and 22 prevent overtravel of the arm 16. A tamper indicator 24, described below, also, is visually observable through the plate.

Figure 2:
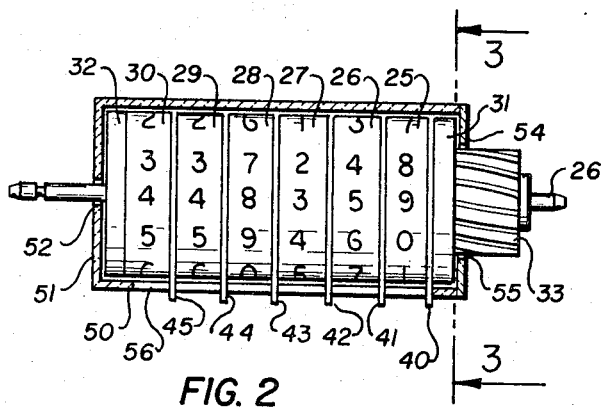
FIG. 2 is an enlarged detail of an odometer with a cover, in section, according to the invention.
Figure 3:
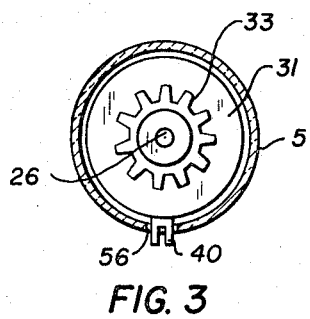
FIG. 3 is an end cross-sectional elevation of the device of FIG. 2 taken along line 3—3.

The odometer is a conventional device. All American made odometers have substantially the same diameter but varying somewhat in length. Each odometer, generally illustrated in FIG. 2, includes a shaft 26 on which is mounted a plurality of number wheels 25, 26, 27, 28, 29 and 30. Securing the number wheels in position are end stop wheels 31 and 32. A gear 33 is arranged to mesh with a drive gear (not shown) driven by a speedometer cable. Between each pair of wheels is a holding lever which holds a small cog meshing with the sun gear on each number wheel according to standard practice. The holding lever has a bifurcated end which fits a bar to prevent it from turning and thereby holds the wheel against turning except when turned by a cog from the adjacent number wheel.

A transparent tube 50, having a substantially closed end 51 with a concentric shaft accommodating bore 52 encloses the number wheels. The internal diameter of the tube is just large enough to permit free rotation of the wheels. A cap 54 in FIG. 2, a generally planar disc having a large central aperture 55, and depending circumferential flange (not shown in FIG. 2) closes the open end of the tube and accommodates the gear 33 and permits it to freely rotate therein. A slot 56 extending from the open end of the tube toward the closed end a sufficient distance, permits the levers 40, 41 etc. to extend beyond the tube in position to be held by a bar.

Figure 4:
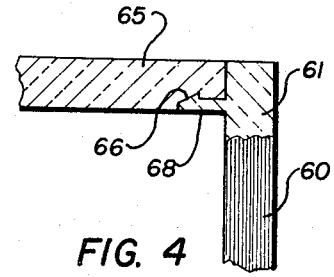
FIG. 4 is an enlarged detail of one form of a seal for a closure for the odometer cover of the invention.

The cap is secured to the tube in such a manner that it cannot be removed with destroying at least the seal, and preferably destroying the cap. A mark or line 60 on cap 61, FIG. 4, (the cap 61 being the same as cap 54 in FIG. 2) is arranged to show through the slot 24 in the speedometer plate to indicate the odometer cover is intact. One form of seal for the cap is shown in FIG. 4, wherein a tube 65 has an undercut rabbet 66 into which fits a mating flange 68 extending from the planar surface of the cap 61. The axial flange 68 includes a portion which fits into the undercut rabbet, and the cap is secured in the tube. The cap, once secured to the tube, cannot be removed without breaking the cap on the flange. Other similar types of seals may, of course, be used, but the self sealing closure as illustrated has the advantage of easy installation. A nonremovable or destructively removed cap is formed by making the disc material generally thin relative to the flange material; thus, a compressive force exerted to push the flange 68 inwardly of the tube 65 will usually shatter the disc 61.

Figure 5:
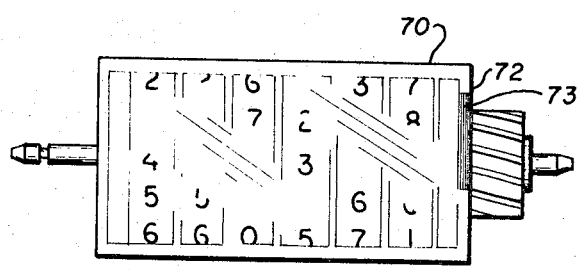
FIG. 5 is a front elevation of a complete odometer with a glass cover of the invention.

The tube is preferably made of glass 70, FIG. 5, which prevents drilling, as may be easily accomplished through a plastic tube next to the turning gears of the wheels. By inserting a pin through a drill hole, one or more number wheels may be held so other wheels can be turned for changing the number which is observable through the odometer slot. The glass tube has a cap 72 sealed thereon, and an indicator line 73 is arranged on the cap to show through the slot 24 on the mounting panel. In the event the glass cover is removed, the indicator will not be seen in the slot 24 and tampering is indicated.

The odometer cover tube should have a thin wall so it can be installed on existing odometers with little change of the speedometer or odometer. Likewise, the cover is installable on new cars with little modification. Various types of chemicals could be put in the glass, plastic or other transparent material of the cover whereby excitation from such rays as infrared, ultraviolet, etc. provides a subtle means of determining the condition of odometer cover.

While the invention has been illustrated by reference to particular embodiments there is no intent to limit the spirit or scope of the invention to the precise details except as defined below.

I claim:

1. A tamper-proof cover for vehicle speedometer odometers, comprising a transparent tubular member having a closed end with a first concentric bore accommodating the shaft of the odometer; a destructible closure for the opposite end of said tube with a second concentric bore of a size to accommodate the shaft mounted drive gear of the odometer; means nonremovably sealing said closure to said tube, and means for indicating displacement of said closure on removal of said closure from said tubular member.

2. A tamper-proof cover for vehicle speedometer odometers according to claim 1 wherein said tube is glass.

3. A tamper-proof cover for vehicle speedometer odometers according to claim 2 wherein said glass tube has a thin wall and said closure has a thin wall.

4. A tamper-proof cover for vehicle speedometer odometers according to claim 1 wherein said means for sealing said closure to said tube includes an undercut internal rabbet adjacent the mouth of said tube and an extending mating flange on said closure nonremovably securing said closure onto said tube.

5. A tamper-proof cover for vehicle speedometer odometers according to claim 1 wherein said means for indicating displacement of said closure is an indicating mark on the edge of said closure and when said closure is closing said tubular member is visible in the odometer mounting in the speedometer.

6. A tamper-proof cover for vehicle speedometer odometers according to claim 1 wherein the material of said cover has an indicator incorporated therein sensitive to activating rays such as infrared and ultraviolet.

7. A tamper-proof cover for vehicle speedometer odometers according to claim 1 wherein said closed end is integral with said tube.